United States Patent
Archer

(10) Patent No.: US 11,831,700 B2
(45) Date of Patent: *Nov. 28, 2023

(54) EMBEDDING MQTT MESSAGES IN MEDIA STREAMS

(71) Applicant: Akamai Technologies, Inc., Cambridge, MA (US)

(72) Inventor: Michael Archer, Cambridge, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/986,605

(22) Filed: Nov. 14, 2022

(65) Prior Publication Data

US 2023/0073074 A1    Mar. 9, 2023

Related U.S. Application Data

(63) Continuation of application No. 16/821,176, filed on Mar. 17, 2020, now Pat. No. 11,503,098.

(60) Provisional application No. 62/953,684, filed on Dec. 26, 2019.

(51) Int. Cl.
| | | |
|---|---|---|
| G06F 13/00 | (2006.01) | |
| H04L 65/80 | (2022.01) | |
| H04W 28/02 | (2009.01) | |
| H04L 67/141 | (2022.01) | |
| H04L 65/65 | (2022.01) | |
| H04L 65/612 | (2022.01) | |

(52) U.S. Cl.
CPC ............ *H04L 65/80* (2013.01); *H04L 65/612* (2022.05); *H04L 65/65* (2022.05); *H04L 67/141* (2013.01); *H04W 28/0268* (2013.01)

(58) Field of Classification Search
CPC ....... H04L 65/80; H04L 65/612; H04L 65/65; H04L 67/141; H04L 47/24; H04L 65/4061; H04L 65/611; H04L 65/70; H04L 67/561; H04L 67/568; H04L 65/4015; H04W 28/0268
USPC .................. 709/231, 236, 246, 217–219, 230
See application file for complete search history.

(56) References Cited

U.S. PATENT DOCUMENTS

| | | | | |
|---|---|---|---|---|
| 10,516,737 | B2 * | 12/2019 | Ferencz, Jr. | ............ B61L 3/127 |
| 10,594,760 | B2 * | 3/2020 | Madani | ................. H04L 67/561 |
| 10,708,360 | B2 * | 7/2020 | Venkatesan | ......... H04L 12/2836 |
| 10,805,400 | B2 * | 10/2020 | Ferencz, Jr. | ......... B61L 15/0018 |
| 11,503,098 | B2 * | 11/2022 | Archer | .............. H04W 28/0268 |
| 2017/0001653 | A1 * | 1/2017 | Ferencz, Jr. | ............ G16Y 10/40 |
| 2018/0213018 | A1 * | 7/2018 | Madani | ................. H04L 67/561 |
| 2018/0270310 | A1 * | 9/2018 | Venkatesan | ......... H04L 67/1001 |
| 2020/0077161 | A1 * | 3/2020 | Lohmar | ............. H04N 21/8456 |

* cited by examiner

*Primary Examiner* — Kenneth R Coulter
(74) *Attorney, Agent, or Firm* — David H. Judson

(57) ABSTRACT

This disclosure provides embedding a messaging channel directly into a media stream, where messages delivered via the embedded messaging channel are the extracted at a client media player. An advantage of embedding a message is that it can be done in a single ingest point and then passes transparently through a CDN architecture, effectively achieving message replication using the native CDN media delivery infrastructure.

10 Claims, 3 Drawing Sheets

EMBEDDING MQTT MESSAGES IN MEDIA STREAMS

BACKGROUND

Technical Field

This application relates generally to media delivery over a network.

Brief Description of the Related Art

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network.

Over the last 15 live streaming services have grown from novelties and experiments into profitable businesses serving an ever-growing cohort of users. Initial streaming implementations mimicked the workflows of the broadcast world, using custom servers to deliver streams via proprietary protocols. More recently, over-the-top (OTT) live streaming has become ubiquitous and enabled significant growth in volume. One primary factor in the success of OTT delivery solutions was the transition in the mid-2000s to HTTP Adaptive Streaming (HAS), which used standard HTTP servers and TCP to deliver the content, thereby allowing CDNs to leverage the full capacity of their HTTP networks to deliver streaming content instead of relying upon smaller networks of dedicated streaming servers. The two dominant HAS formats are Apple® HTTP Live Streaming (HLS), and MPEQ DASH. HLS traditionally used TS containers to hold muxed audio and video data, while DASH preferred the ISO-Base Media File Format holding demuxed tracks. Accordingly, content owners wanting to reach the diversity of devices have to package and store two sets of files, each holding exactly the same audio and video data. To address this inefficiency, the Common Media Application Format (CMAF) was developed in 2017. CMAF is a restricted version of the well-established fragmented mp4 container and is similar to the DASH-ISO file format. CMAF is a standardized container that can hold video, audio or text data. CMAF is efficient because CMAF-wrapped media segments can be simultaneously referenced by HLS playlists ad DASH manifests. This enables content owners to package and store one set of files.

MQTT (formerly MQ Telemetry Transport) is an ISO standard (ISO/IEC PRF 20922) publish-subscribe-based "lightweight" messaging protocol for use on top of the TCP/IP protocol. In software architecture, publish-subscribe is a messaging pattern where senders of messages, called publishers, do not program the messages to be sent directly to specific receivers, called subscribers, but instead characterize published messages into classes without knowledge of which subscribers, if any, there may be. Similarly, subscribers express interest in one or more classes and only receive messages that are of interest, without knowledge of which publishers, if any, there are. MQTT is designed for connections with remote locations where a small code footprint is required or the network bandwidth is limited. The publish-subscribe messaging pattern requires a message broker. The broker is responsible for distributing messages to interested clients based on the topic of a message.

CDN media customers have been delivering large scale media streams (e.g. live events) for quite some time. They desire to involve end users in a more immersive and interactive experience that keeps the end users engaged with content longer. Example scenarios include, without limitation, quiet period during sporting events, gamifying media experiences with quiz or voting capabilities, and the like. To that end, many customers are in the process of creating an associated bi-directional messaging channel that aims to meet the interactive needs of this type of new media experience. One naïve solution is to deploy existing messaging products and services alongside the media streams to meet these requirements. The challenge, however, is that most messaging products do not scale to the same levels as the media streaming infrastructure that is already built out and mature. Some content providers have attempted to address this problem by building out custom solution, but the complexity and difficulties of managing such one-off approaches it daunting. Moreover, when using a companion messaging platform solution, it is difficult to get the media content synchronized with the messaging content to provide the desired seamless experience. More problematic is that the off-the-shelf messaging platform cannot scale to the millions of end users needed, let alone with the necessary or desired security to ensure a safe experience. Indeed, existing solutions would require a massive messaging infrastructure to be built out to send just a single message from one publisher (content owner/distributor) to many millions of clients.

BRIEF SUMMARY

This disclosure provides embedding a messaging channel directly into a media stream, where messages delivered via the embedded messaging channel are the extracted at a client media player. An advantage of embedding a message is that it can be done in a single ingest point and then passes transparently through a CDN architecture, effectively achieving message replication using the native CDN media delivery infrastructure.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
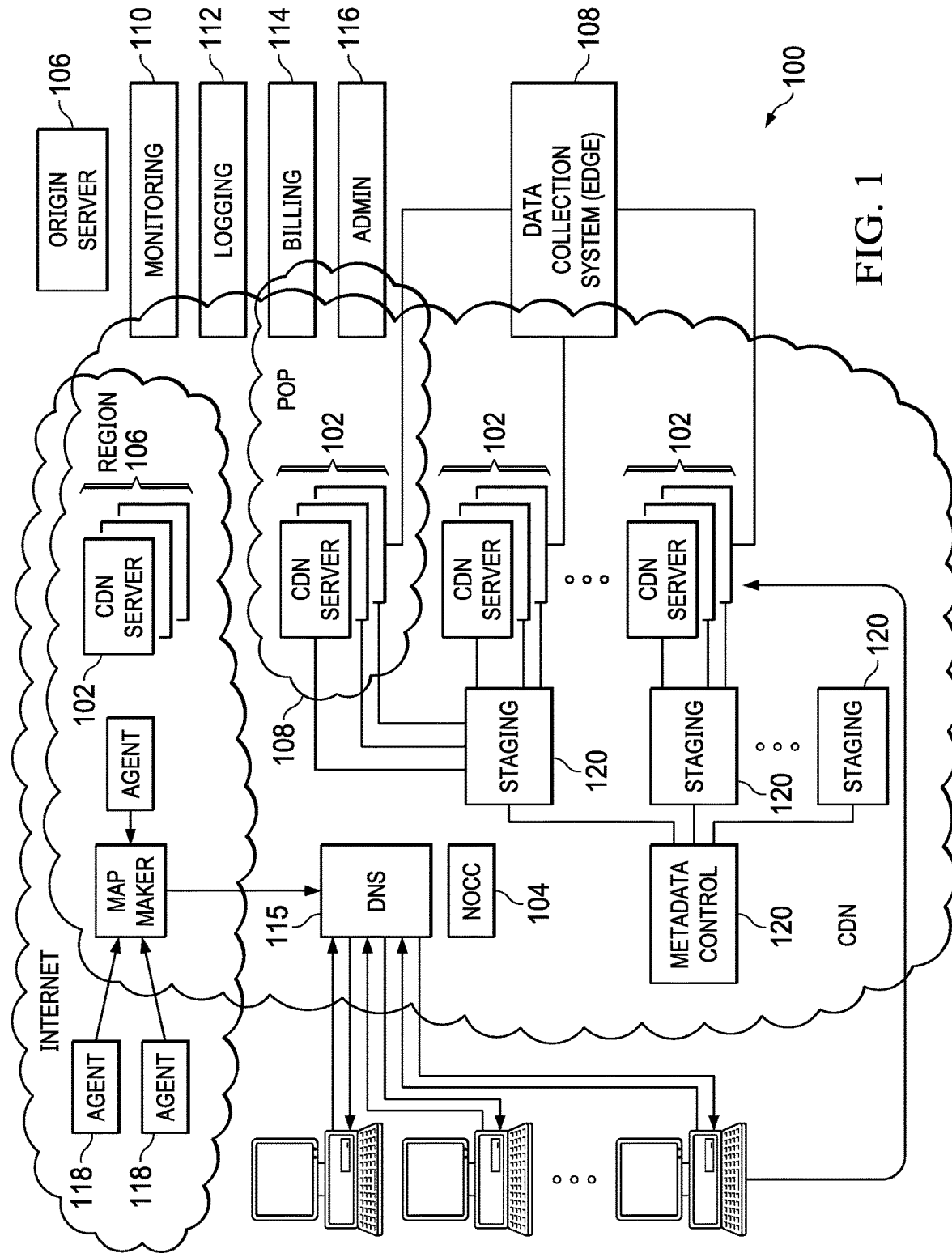
FIG. 1 is a block diagram illustrating a known distributed computer system configured as a content delivery network (CDN)

In a known system, such as shown in FIG. 1, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
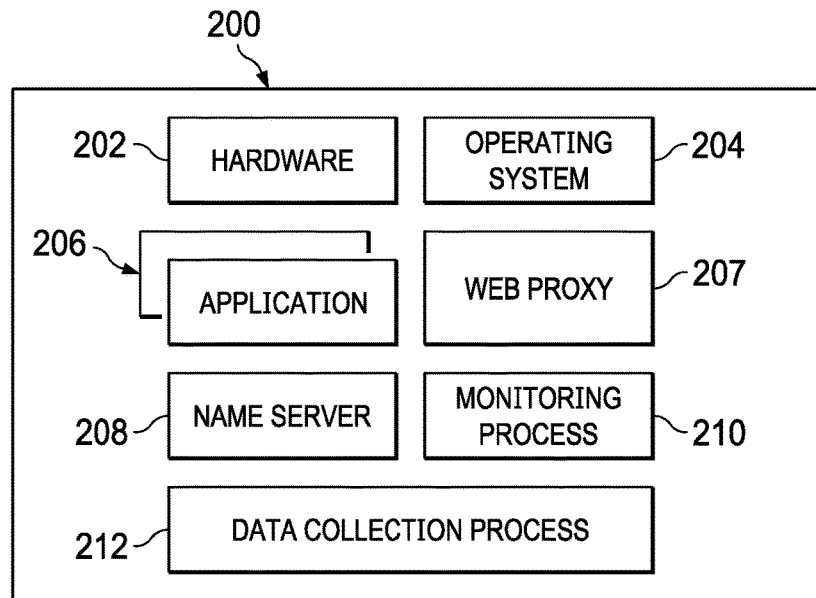
FIG. 2 is a representative CDN edge machine configuration.

As illustrated in FIG. 2, a given machine 200 in the content delivery network comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" or "ghost" process), a name server 208, a local monitoring process 210, a distributed data collection process 212, and the like. For streaming media, the machine may include one or more media servers, such as a Windows Media Server (WMS) or Flash server, as required by the supported media formats, or it may utilize HTTP-based delivery of chunked content fragments that constitute a stream.

Figure 3:
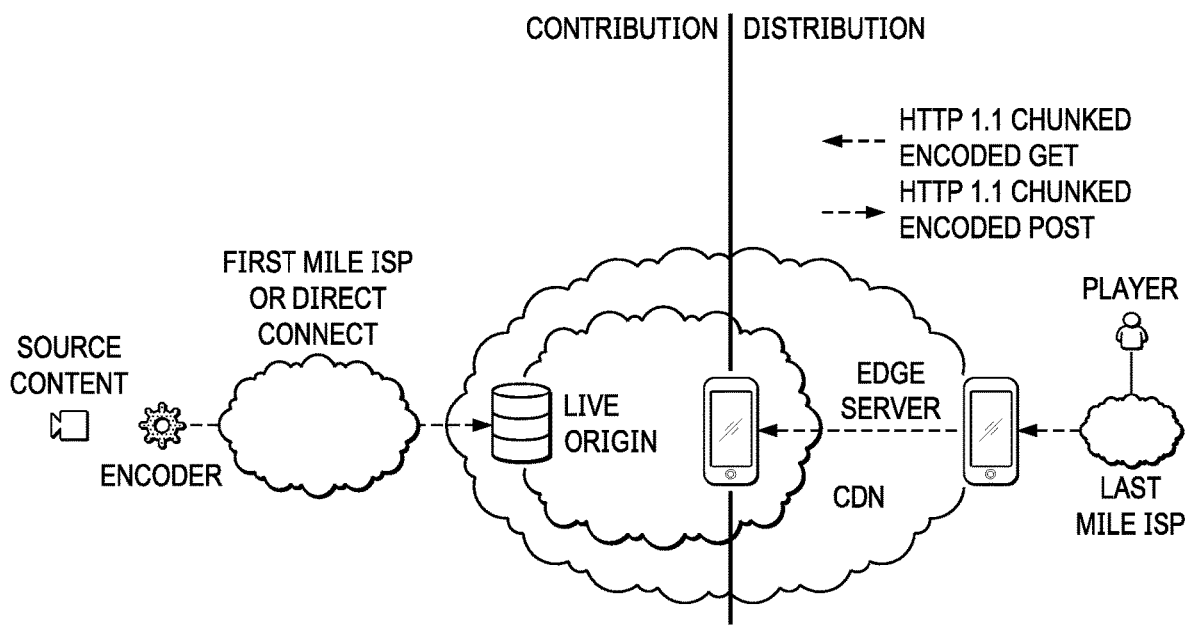
FIG. 3 is a typical ingest and CDN distribution solution.

FIG. 3 depicts a typical CMAF ingest and CDN distribution workflow. The contribution side comprises a source camera, encoder, and a first mile ISP or direct connect network. After capture, the encoder pushes (via HTTP POST) the segments of the captured media to a live origin. A live origin has an ingest layer to accept the content, and a mid-tier layer to present the content for distribution. On the distribution side, a player pulls the content chunks (via HTTP GET) from an edge server, which in turn sources them from the origin. Both of these halves need to work together to transfer the chunks as quickly as possible. Typically, this transfer is done using chunked transfer encoding. In operation, the encode uses HTTP 1.1 chunked transfer encoding to send an encoded CMAF chunk to the origin for redistribution. On the distribution side, the chunk's journey is pull-based and driven by the media player. The media player reads a manifest or playlist, which describes the content, calculates a point (in the media stream) at which it wishes to start playback, and then makes a request for a segment. The player requests a segment and not a chunk, because the chunks are not addressable units typically. When asked for a segment, the CDN edge server returns all the chunks it has for that segment in sequential order using chunked transfer encoding. As more chunks arise from the origin, they are fed to the client until eventually the complete segment has been delivered. The CDN edge also caches the chunks flowing through it to build up a cached representation of the complete segment.

The above-described distribution side works in a similar manner with respect to "on-demand" media, which typically is stored in an origin. The origin may be hosted in a customer's own infrastructure or itself outsourced to the cloud, the CDN, or the like.

Generalizing, a CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

Messaging for Live Streaming

Figure 4:
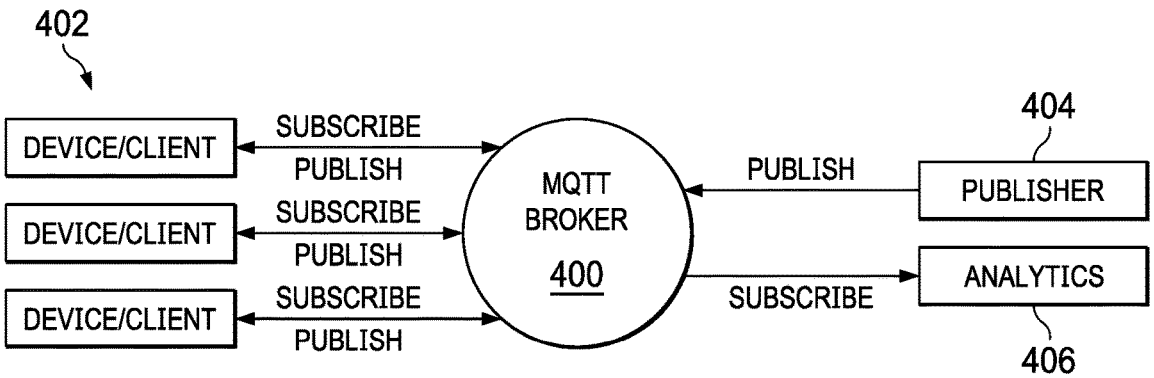
FIG. 4 depicts a MQTT-based system.

As noted MQTT is a highly-efficient protocol for transferring messages between device and applications, as well as cloud services. It was designed initially to support low-powered Internet of Things (IoT) devices, thereby helping to save battery life by using minimal CPU and networking. Due to the efficient nature of the protocol, it is an ideal fit in mobile and cellular devices. As also mentioned, MQTT is a Pub-Sub (Publish Subscribe) protocol that uses a message browser to send messages between clients and groups. FIG. 4 depicts a representative MQTT system, which comprises MQTT broker 400 serving messages to multiple devices/clients 402. In this system, the messages are published by publisher 404, and an analytics service 406 is depicted as a subscriber. The MQTT protocol provides three (3) qualities of service for delivering messages between clients and servers, where QoS is an attribute of an individual message being published; these values are "at most once" (0), "at least once" (1), and "exactly once" (2). An application sets the QoS for a specific message by setting a field to the required value, e.g. QoS0. A subscribing client can set a maximum QoS a server uses to send messages that match the client subscriptions. The QoS of a message forwarded to a subscriber may have a QoS that differs from that given to the message by the original publisher (typically the lower of the values is used to forward a message). For QoS0, the message is delivered at most once, or it may not be delivered at all, and its delivery across the network is not acknowledged; further, typically the message is not stored. The message may be lost if the client is disconnected, or if the server fails.

Figure 5:
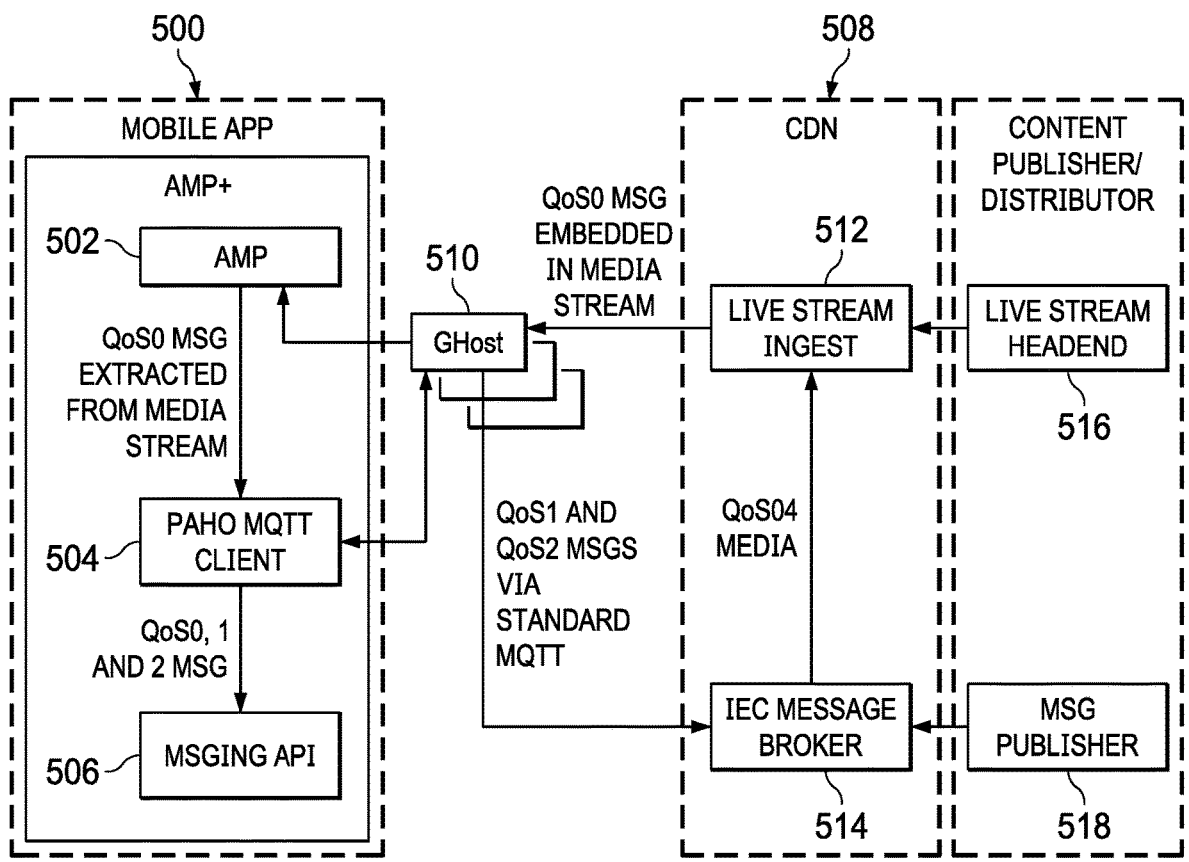
FIG. 5 depicts a system for injecting MQTT messages into a media stream and for delivering the media stream according to the technique of this disclosure.

According to this disclosure, and in lieu of using a separate MQTT system, the approach herein scales MQTT QoS0 (at most once) messaging to end clients (and thus achieves a 'msg broadcast'-like capability) by embedding the message itself within the media stream, and by providing an enhanced media player to extract the message on the client device. FIG. 5 depicts one implementation of this approach. In this example embodiment, an endpoint such as a mobile app 500 executes a media player framework (AMP) 502 together with an MQTT client 504 and API 506. In this embodiment, the MQTT client 504 is a Paho MQTT client. The MQTT client provides for a transparent ingestion of the message received by the mobile app, thereby enabling the messaging to be achieved as if the client had received the message directly from a broker. The CDN 508 comprises the edge servers running the HTTP web proxy (GHost) 510, a live stream ingest component 512, and an IEC message broker 514 (the MQTT broker). As depicted, the live stream ingest component 512 receives the live stream from a source (e.g., via HTTP POST, as previously described), such as live stream headend 516, and the message broker 514 receives the messages published by the message publisher 518. In one embodiment, the message broker 514 receives the QoS message from the publisher 518, and forwards it to the live stream ingest component 512, which in turn embeds the message in the media stream. When the media stream is delivered via the edge server in the manner previously described (e.g., using chunked transfer encoding, via HTTP GET requests, etc.), the message also is delivered to the media player. At the client, the QoS0 message is extracted from the media stream and passed to the MQTT client 504, which consumes it. As also depicted, QoS1 and QoS2 messages received by the edge server may be returned to the IEC message broker for consumption by one or more subscribers (not shown).

Preferably, IEC broker 514 supports a media-enhanced publishing API that allows a CDN customer to specify the message, as well as the media stream URL in which the data should be embedded. The publishing API also enables the customer to specify an MQTT topic and potentially a timestamp when the message should be displayed (or otherwise processed) in the client. Preferably, security and authorization for the service is handled by the IEC broker, by a third party, or by some native CDN system or device. Preferably, the message is embedded within a media container, or via some other approach such as closed captioning, subtitles, SAP capabilities, or the like. An embedded data stream may be bootstrapped onto an existing data structure within HLS and/or MPEG/DASH. Without intending to be limiting, the message size may be modified (reduced) if necessary to avoid unintended latency for the media stream data.

Streaming formats support various methods of injecting metadata into a media stream (a container format), and one or more of these methods may be utilized for the purposes described above. In particular, and according to this approach, the MQTT binary data (e.g., the QoS0 message) is injected into a media stream and, as such, transported to the media player directly. As published, the message may carry with it timing information to further control when the message is to be injected/embedded in the media stream. This is particularly useful in enabling synchronization of the media content with the message content.

There are many potential use cases: real-time quizzing, sports data feeds, video and live augmented reality (AR) gaming, music streaming, general data services, and the like.

The technique depicted provides significant advantages, namely, massive scalability by leveraging the size and scale of the CDN media delivery network. The embedding operation preferably is transparent to the edge server, and the technique provides for media frame level synchronization of media content and messages.

The media stream (or, more generally, content) into which the MQTT message(s) are injected/embedded may be VOD-based, as opposed to live or near-live. The particular messages need not just include QoS attributes. Any type of MQTT message or message attribute may be embedded. Multiple different MQTT messages or message attributes may be embedded into the media stream. The particular manner in which the messages are embedded may vary according to implementation. In one approach, the MQTT QoS0 message is delivered in successive chunks comprising a segment of the media stream. The particular manner in which the message is rendered within or by the mobile application, e.g., as an overlay on a visual display, as an audio (sound) file, etc., will depend on the nature and operation of the application responsible for handling the rendering of the message.

Each above-described process preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the present invention is software written in a given programming language that runs in conjunction with a DNS-compliant name server (e.g., BIND) on a standard Intel hardware platform running an operating system such as Linux. The functionality may be built into the name server code, or it may be executed as an adjunct to that code. A machine implementing the techniques herein comprises a processor, computer memory holding instructions that are executed by the processor to perform the above-described methods.

While given components of the system have been described separately, one of ordinary skill will appreciate that some of the functions may be combined or shared in given instructions, program sequences, code portions, and the like.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The techniques herein generally provide for the above-described improvements to a technology or technical field, as well as the specific technological improvements to various fields including collaboration technologies including videoconferencing, chat, document sharing and the like, distributed networking, Internet-based overlays, WAN-based networking, efficient utilization of Internet links, and the like, all as described above.

What is claimed follows below.

The invention claimed is:

1. An information delivery system, comprising:
  a first component executed in first hardware and including an application programming interface (API) configured to:
    receive a message conforming to a message transport protocol, wherein the message transport protocol is MQ Telemetry Transport (MQTT); and
    selectively forward the message for embedding into a media stream;
  a second component executed in second hardware and including software configured to:
    receive the media stream for delivery via a transport protocol;
    receive the message forwarded by the first component; and
    embed the message into the media stream; and
  a third component executing in third hardware and including second software configured to:
    receive the media stream having the message embedded therein; and
    responsive to receipt of a request from a client, deliver the media stream with the message embedded therein to the client.

2. The information delivery system as described in claim 1 wherein the message conforming to the message transport protocol has a quality of service (QoS) attribute.

3. The information delivery system as described in claim 2 wherein the QoS attribute is a QoS0 (at most once) attribute, thereby avoiding unintended latency for the media stream.

4. The information delivery system as described in claim 1 wherein the message is embedded into the media stream in association with a timestamp that identifies a given time when the message is to be displayed or processed at the client.

5. The information delivery system as described in claim 1 wherein the message is associated with a messaging topic.

6. The information delivery system as described in claim 1 wherein the media stream is delivered via chunked transfer encoding.

7. The information delivery system as described in claim 1 wherein the media stream is a continuous media packaged according to a Common Media Application Format (CMAF).

8. The information delivery system as described in claim 1 wherein the third component is further configured to return an MQTT message to the first component.

9. The information delivery system as described in claim 1 wherein the media stream is a live stream, and wherein the second component receives the media stream substantially in real-time as the media stream is published.

10. The information delivery system as described in claim 9 wherein the message is received from the first component and embedded into the live stream substantially in real-time.

* * * * *